July 9, 1957 W. A. SWENSON 2,798,683
DELAYED RELEASE MECHANISM FOR PARACHUTES
Filed March 19, 1952 2 Sheets-Sheet 1

INVENTOR.
WAYNE A. SWENSON
BY
ATTORNEYS

July 9, 1957 W. A. SWENSON 2,798,683
DELAYED RELEASE MECHANISM FOR PARACHUTES
Filed March 19, 1952 2 Sheets-Sheet 2

INVENTOR.
WAYNE A. SWENSON
BY
ATTORNEYS

United States Patent Office 2,798,683
Patented July 9, 1957

2,798,683

DELAYED RELEASE MECHANISM FOR PARACHUTES

Wayne A. Swenson, Van Nuys, Calif.

Application March 19, 1952, Serial No. 277,517

3 Claims. (Cl. 244—149)

(Granted under Title 35, U. S. Code (1952), sec. 266)

The invention described herein may be manufactured and used by or for the Government of the United States of America for governmental purposes without the payment of any royalties thereon or therefor.

This invention relates to mechanism for releasing a parachute from a rapidly moving container.

More specifically, the invention contemplates the provision of a main or load carrying parachute and a drag parachute, enclosed in a common container which is dropped from an aircraft at, or projected ballistically to, a predetermined point in space. The drag parachute is then opened to decrease the speed of the assembly to a safe value, whereupon the main parachute with its load is withdrawn from the container and opened. By this arrangement the impact incident to opening of the main parachute is decreased, and control of the operation is enhanced, as pointed out hereinafter.

The invention is hereinafter described with particular reference to the case where the load is a flare or other illuminating device enclosed in the container, but it will be apparent that it may be used in connection with parachutes carrying other types of load, such as military materiel or even personnel.

An object of the invention is to provide an improved mechanism for releasing a parachute from a rapidly moving container.

A further object of the invention is to delay the ejection of the main parachute until the velocity of the assembly has been reduced sufficiently to prevent damage to the main parachute or its load.

Other objects and many of the attendant advantages of this invention will be readily appreciated as the same becomes better understood by reference to the following description.

Figure 1:
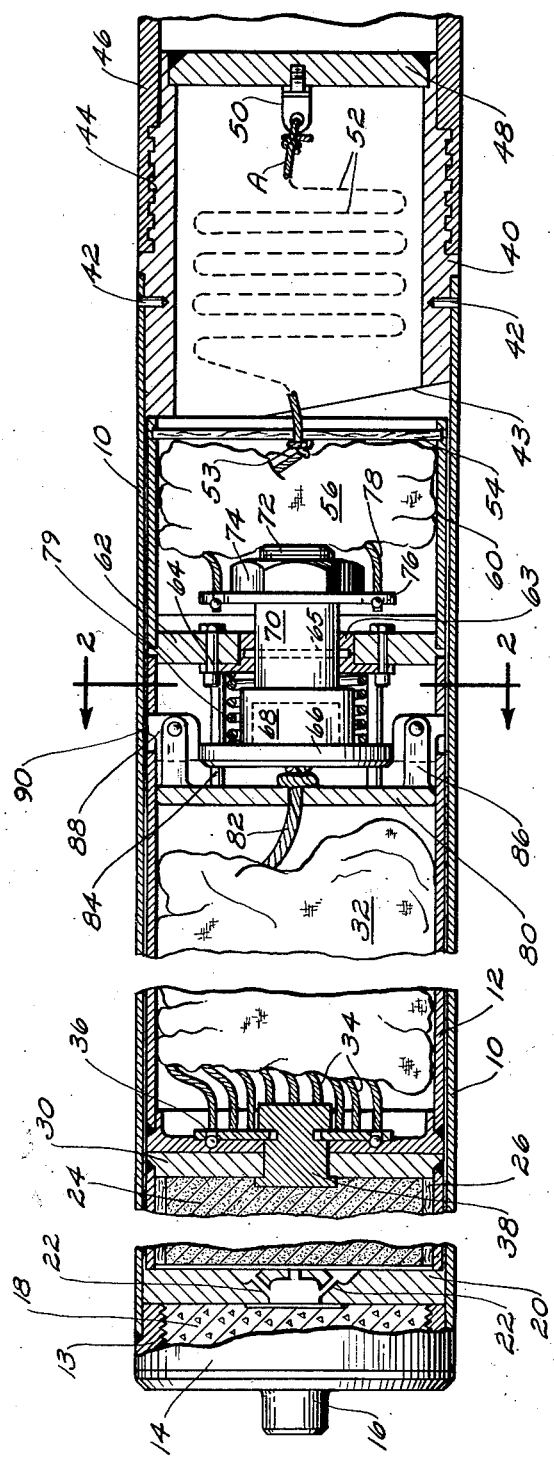
Fig. 1 is a view in longitudinal section of an assembly embodying the invention.
Figure 2:
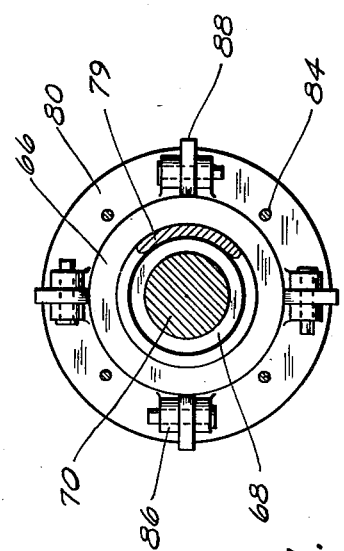
Fig. 2 is a transverse sectional view taken on line 2—2 of Fig. 1.

The device shown in the drawings comprises a cylindrical body formed of an outer shell 10 and an inner shell 12 rigidly but releasably secured together by means hereinafter described. Secured as by welding to the forward end of the shell 10 is a ring 13 in which is threaded a plug 14 containing a time fuze indicated at 16 and designed to ignite a black power charge 18. A pressure plate 20 slidable in shell 10 abuts the forward end of shell 12 and is provided with apertures 22 through which flame from the powder may pass to the parachute load, which may be a flare candle comprising a combustible composition 24 enclosed in a casing 26.

A double partition 30 is fixedly mounted in shell 12 and separates the composition 24 from a parachute compartment which contains the main parachute 32 in folded condition, having its shroud lines 34 connected to an attachment plate 36. Plate 36 is connected to partition 30 by any suitable means such as the connecting member indicated at 38.

The rear end of the shell 10 is releasably secured in telescoping relation to a sleeve 40 by means of shear pins 42. The forward end of sleeve 40 is cut away as indicated at 43. Sleeve 40 is fixedly secured by threads 44 to the forward end of a rocket motor, indicated at 46. A plug 48 closes the rear end of sleeve 40 and carries an eyebolt or the like 50 to which is secured the forward end of a lanyard 52 coiled within the sleeve. Lanyard 52 passes through and is secured by a knot 53 to a cardboard retainer disk 54, and its forward end is secured to the top of a drag parachute 56.

At the rear end of shell 12 is a tube 60, aligned therewith and separated therefrom by an annular plate 62 having a central aperture in which is mounted a bushing 63 held in place by capscrews 64. The rear end of tube 60 is held in abutting relation to sleeve 40 by the tension exerted by shell 10. Slidably mounted in the bushing, but held against movement by a shear pin 65, is a stud comprising a forward retaining disk 66, an enlarged portion 68 which constitutes a stop cooperating with bushing 63 to limit rearward movement of the stud, a shank 70 which contains the shear pin 65, and a threaded rear end 72 having a nut 74 which retains an attachment plate 76 to which are secured the lines 78 of the drag parachute 56. A stiff compression spring 79 is interposed between disk 66 and bushing 63 to urge the stud forwardly.

A disk 80 is disposed forwardly of the disk 66 and has secured thereto the lanyard 82 of the main parachute 32. Disk 80 is fixedly secured to plate 62 by bolts 84 and is formed with rearwardly extending bifurcated studs 86 in which are pivotally mounted dogs 88 having detents 90 engaging in slots in the wall of shell 12. With the parts in the positions shown in Fig. 1, it will be seen that the detents 90 are prevented from rotating inwardly to released position by the pressure of disk 66 against the inner surfaces of the dogs.

*Operation*

Figure 3:
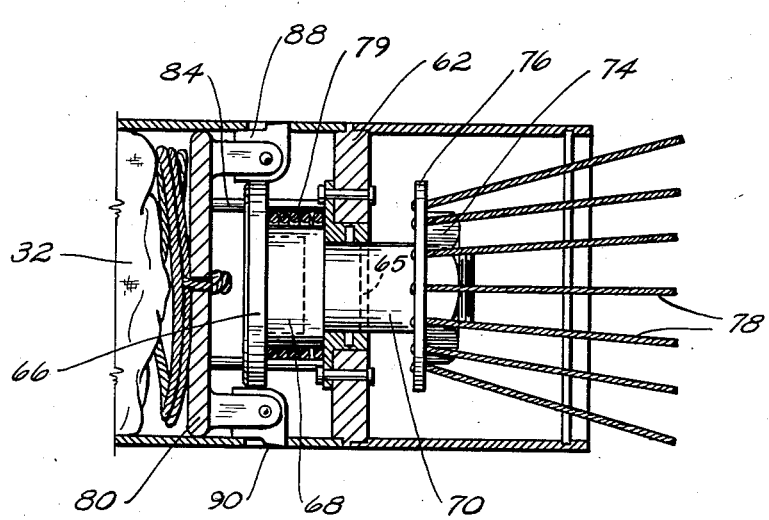
Figs. 3 and 4 are schematic views showing successive positions taken by the release mechanism.

In the illustrated embodiment, the mechanism is propelled to the desired point in space by the rocket motor 46, although it will be evident that it might be propelled by other means, or merely dropped from an airplane in flight. The time fuze 16 then initiates the powder charge 18 which ignites the flare composition 24 and also creates sufficient pressure upon pressure plate 20 to cause it to move rearwardly relative to shell 10, thus forcing shell 10 forwardly out of engagement with shell 12, shearing pins 42 in the process. The container formed by shell 12 and tube 60 will then fall away from sleeve 40, there being nothing holding them together. When the container and sleeve have separated by a certain distance, lanyard 52 will be tautened, and will withdraw drag parachute 56 from the tube 60. The drag parachute, upon opening, will brake the rate of descent or other velocity of the assembly, exerting tension on lines 78 and shearing pin 65. The stud 68—70 is thereby moved rearwardly, compressing spring 79, until the parts are in the positions shown in Fig. 3, wherein it will be noted that the disk 66 still retains the dogs 88 against rotation.

Figure 4:
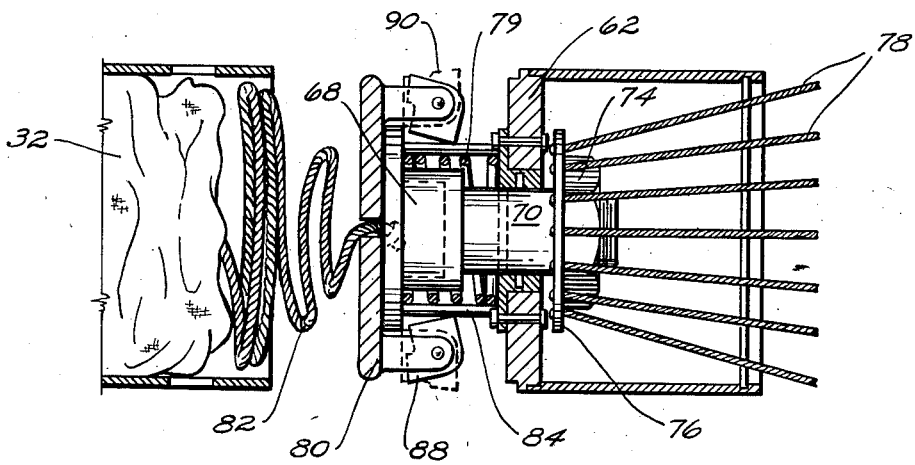

When the velocity of the assembly has decreased to a predetermined value, the drag of the drag parachute will have decreased to the point where spring 79 will move the disk 66 forwardly to the position shown in Fig. 4, where it clears the dogs 88. Tension exerted on bolts 84 by the drag parachute will then cause the dogs to rotate inwardly on their pivots, disengaging the detents from their slots and releasing tube 60 and its associated parts from shell 12. Finally, the lanyard 82 will withdraw the main parachute from shell 12 and it will spread to bear its load.

Obviously many modifications and variations of the present invention are possible in the light of the above teachings. It is therefore to be understood that within the scope of the appended claims the invention may be practiced otherwise than as specifically described.

What is claimed is:

1. Parachute mechanism comprising a container, a main parachute therein, a closure connected to said parachute and normally operative to retain the same in the container, means for withdrawing said closure from the container including a drag parachute connected to the closure and operative to exert force thereon, and latch mechanism including a detent connecting said closure and said container and normally preventing withdrawal of said closure, a retaining member operative in normal position to maintain said detent in operative position, a shear pin for releasably maintaining said retaining member in normal position but rupturable by the force exerted by the drag parachute, and spring means for moving the retaining member to inoperative position upon rupture of the shear pin.

2. Parachute mechanism comprising a container, a main parachute therein, a closure connected to said parachute and normally operative to retain the same in the container, means for exerting force on said closure tending to withdraw it from said container including a drag parachute connected to the closure, and latch mechanism including a detent connecting said closure and said container and normally preventing withdrawal of said closure, a retaining member operative in normal position to maintain said detent in operative position, a shear pin for releasably maintaining said retaining member in normal position but rupturable by the force exerted by the drag parachute, and spring means for moving the retaining member to inoperative position upon rupture of the shear pin.

3. Parachute mechanism comprising a container, a main parachute therein, a closure connected to said parachute and normally operative to retain the same in the container, means for withdrawing said closure from the container including a drag parachute, means connecting the drag parachute to said closure to enable the drag parachute to exert force tending to withdraw the closure from the container, said connecting means comprising latch mechanism including a detent connecting said closure and said container and normally preventing such withdrawal of said closure, a retaining member operative in normal position to maintain said detent in operative position, a shear pin for releasably maintaining said retaining member in normal position but rupturable by the force exerted by the drag parachute, and spring means for moving the retaining member to inoperative position upon rupture of the shear pin.

References Cited in the file of this patent

UNITED STATES PATENTS

| 1,985,890 | Ellis | Jan. 1, 1935 |
| 2,036,279 | King | Apr. 7, 1936 |
| 2,124,876 | Driggs | July 26, 1938 |
| 2,521,516 | Heidman | Sept. 5, 1950 |
| 2,562,459 | Hoey | July 31, 1951 |
| 2,581,645 | Frieder | Jan. 8, 1952 |
| 2,582,113 | Finken | Jan. 8, 1952 |

FOREIGN PATENTS

| 581,726 | Great Britain | Oct. 23, 1946 |
| 599,385 | Great Britain | Mar. 11, 1948 |